(12) United States Patent
Qian et al.

(10) Patent No.: US 7,728,544 B2
(45) Date of Patent: Jun. 1, 2010

(54) SYSTEM AND METHOD FOR CONTROLLING INPUT LINE HARMONICS IN A MOTOR DRIVE

(75) Inventors: Wei Qian, Shanghai (CN); Qiang Yin, Shanghai (CN); Lixiang Wei, Whitefish Bay, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 407 days.

(21) Appl. No.: 11/745,861

(22) Filed: May 8, 2007

(65) Prior Publication Data

US 2008/0278109 A1    Nov. 13, 2008

(51) Int. Cl.
*H02P 27/04* (2006.01)
(52) U.S. Cl. .................. 318/803; 318/799; 318/801
(58) Field of Classification Search .......... 318/803, 318/799, 801, 802, 807, 629; 361/182; 307/129
See application file for complete search history.

(56) References Cited

U.S. PATENT DOCUMENTS 3,944,846 A * 3/1976 Thompson et al. .......... 307/129

* cited by examiner

*Primary Examiner*—Karen Masih
(74) *Attorney, Agent, or Firm*—Quarles & Brady LLP; Alexander R. Kuszewski; John M. Miller

(57) ABSTRACT

A motor drive system is disclosed that includes a power input configured to receive alternating current (AC) power and a rectifier having a switching frequency selected to convert the AC power to direct current (DC) power. The motor drive unit also includes an input filter circuit connected between the power input and the rectifier and configured to suppress frequency harmonics across a range of harmonics. Additionally, the motor drive unit includes a block filter circuit connected between the power input and the rectifier and configured to substantially block frequency harmonics associated with the switching frequency of the rectifier. Furthermore, the motor drive unit includes an inverter configured to receive the DC power from the rectifier and convert the DC power to a series of pulses configured to drive a motor.

20 Claims, 6 Drawing Sheets

SYSTEM AND METHOD FOR CONTROLLING INPUT LINE HARMONICS IN A MOTOR DRIVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to motor drive systems and, more particularly, to a system and method for suppressing harmonics injected onto AC power lines when operating a motor drive unit.

Often, power delivered from a power source or supply is not properly conditioned for consumption. For example, power plants are linked to power consuming facilities (e.g., buildings, factories, etc.) via utility grids that are designed to be extremely efficient at delivering massive amounts of power. To facilitate efficient distribution, power is delivered over long distances as fixed frequency three-phase alternating current (AC) power. As such, the power must typically be converted or "conditioned" prior to consumption.

For example, motors and their associated loads are one type of common inductive load employed at many consuming facilities that require power conditioning. When a motor is the consuming point, power "conditioning" systems are utilized to convert the fixed frequency AC power delivered over utility grids to a form suitable for driving the motor. To this end, power conditioning for motor systems typically include AC-to-DC (direct current) rectifiers that convert the utility AC power to DC power applied to positive and negative DC buses (i.e. across a DC link). The power distributed across the DC buses is then converted, for example, by use of an inverter, to AC power designed to drive the motor.

Specifically, referring to FIG. 1, the present invention will be described with respect to a motor system 10. The motor system 10 generally includes a power supply 12, a motor drive unit 14, and a motor 16. The power supply 12 provides power to the motor drive unit 14 that, in turn, converts the power to a more usable form for the motor 16 that drives an associated load 18.

The motor drive unit 14 includes a variety of components, such as a rectifier 20, an inverter 22, and a controller 24. During operation, the power supply 12 provides three-phase AC power, for example, as received from a utility grid over transmission power lines 26. However, it is also contemplated that the power supply 12 may deliver single-phase power. The rectifier 20 is designed to receive the AC power from the power supply 12 and convert the AC power to DC power that is delivered to positive and negative DC buses 28, 30 of a DC link 32. Specifically, the rectifier 20 includes a plurality of switches that are controlled by the controller 24 using pulse-width modulation (PWM) to rectify the AC power received from the AC power lines 26.

The DC power is delivered from the rectifier 20 over the positive and negative DC buses 28, 30 to the inverter 22. The inverter 22 includes a plurality of switching devices (e.g., IGBTs or other semiconductor switches) that are positioned between the positive and negative buses 28, 30 and controlled by the controller 24 to open and close specific combinations of the switches to sequentially generate pulses on each of the supply lines 34 to drive the motor 16 and, in turn, the load 18 through a drive shaft 36.

While PWM control of the rectifier 20 is an efficient means for converting the AC power received from the power lines 26 to DC power, high-frequency harmonics can be injected onto the power lines 26 as a result. These injected high-frequency harmonics can adversely affect operation of the motor drive unit 14 and other systems connected to the power supply 12.

As a result, a filter 38 is often arranged between the power supply 12 and the motor drive unit 14. Typically, an inductor $L_1$ is arranged to act as a filter to suppress high-frequency harmonics injected onto the power lines 26 by operation of the motor drive unit 14. However, in many cases, the inductor $L_1$ is unable to sufficiently attenuate the high-frequency harmonics.

Accordingly, an additional inductor $L_m$ and a capacitor $C_1$ are sometimes included to construct an LCL filter. While the LCL filter is typically insufficient to suppress all harmonics from being injected onto the power lines 26, it provides increased attenuation over the simple inductor $L_1$ filter, such that the harmonics injected are tolerated by the system.

However, as current power regulations, such as IEEE 519, become more and more stringent, the amount of high-frequency harmonics tolerated under the regulations decrease. Furthermore, since harmonics regulations vary between countries, the amount of harmonics tolerated under these regulations varies by country. Accordingly, motor drive units must be tailored to meet the requirements of each country or must be designed to meet the most stringent of harmonics regulations.

It would be desirable to have a system and method for suppressing or substantially eliminating harmonics injected onto AC power lines when operating a motor drive unit.

BRIEF SUMMARY OF THE INVENTION

The present invention overcomes the aforementioned drawbacks by providing a block filter designed to substantially block harmonics associated with a rectifier switching frequency of a motor drive unit. When coupled with an LCL filter, the combined filter and block system substantially reduces or blocks harmonics from being injected onto the supply lines from the power supply, including specific frequency harmonics associated with the switching frequency component of the PWM rectifier.

In accordance with one aspect of the present invention, a motor drive system is disclosed that includes a power input configured to receive alternating current (AC) power and a rectifier having a switching frequency selected to convert the AC power to direct current (DC) power. The motor drive unit also includes an input filter circuit connected between the power input and the rectifier and configured to suppress frequency harmonics across a range of harmonics. Additionally, the motor drive unit includes a block filter circuit connected between the power input and the rectifier and configured to substantially block frequency harmonics associated with the switching frequency of the rectifier. Furthermore, the motor drive unit includes an inverter configured to receive the DC power from the rectifier and convert the DC power to a series of pulses configured to drive a motor.

In accordance with another aspect of the present invention, a motor drive unit is disclosed that includes an input configured to receive AC power. A filter and block circuit are included that are configured to filter the AC power and that include an input inductor ($L_1$), a main inductor ($L_m$), a main capacitor ($C_m$), a block inductor ($L_t$), and a block capacitor ($C_t$) arranged in an LCL-plus-C circuit. The motor drive unit also includes a rectifier configured to receive filtered AC power from the filter and having a switching frequency selected to convert the AC power to DC power and an inverter configured to receive the DC power from the rectifier and convert the DC power to a series of pulses configured to drive a motor. At least one of the block inductor and block capacitor are configured to substantially block harmonics associated with the switching frequency of the rectifier.

In accordance with yet another aspect of the invention, an input filter is disclosed that is configured to be connected to a power supply line to receive AC power and deliver the AC power to a rectifier. The rectifier includes a plurality of switches controlled by at least one switching signal having a switching frequency to convert the AC power to DC power and deliver the DC power to an inverter. The inverter is configured to convert the DC power to pulses configured to drive a motor. The input filter includes a main inductor configured to receive the AC power and reduce harmonics along the power supply line, a block inductor connected to the main inductor, and a block capacitor connected to the main inductor. At least one of the block inductor and the block capacitor are arranged in a block circuit configured to substantially reduce harmonics associated with the switching frequency.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 2:
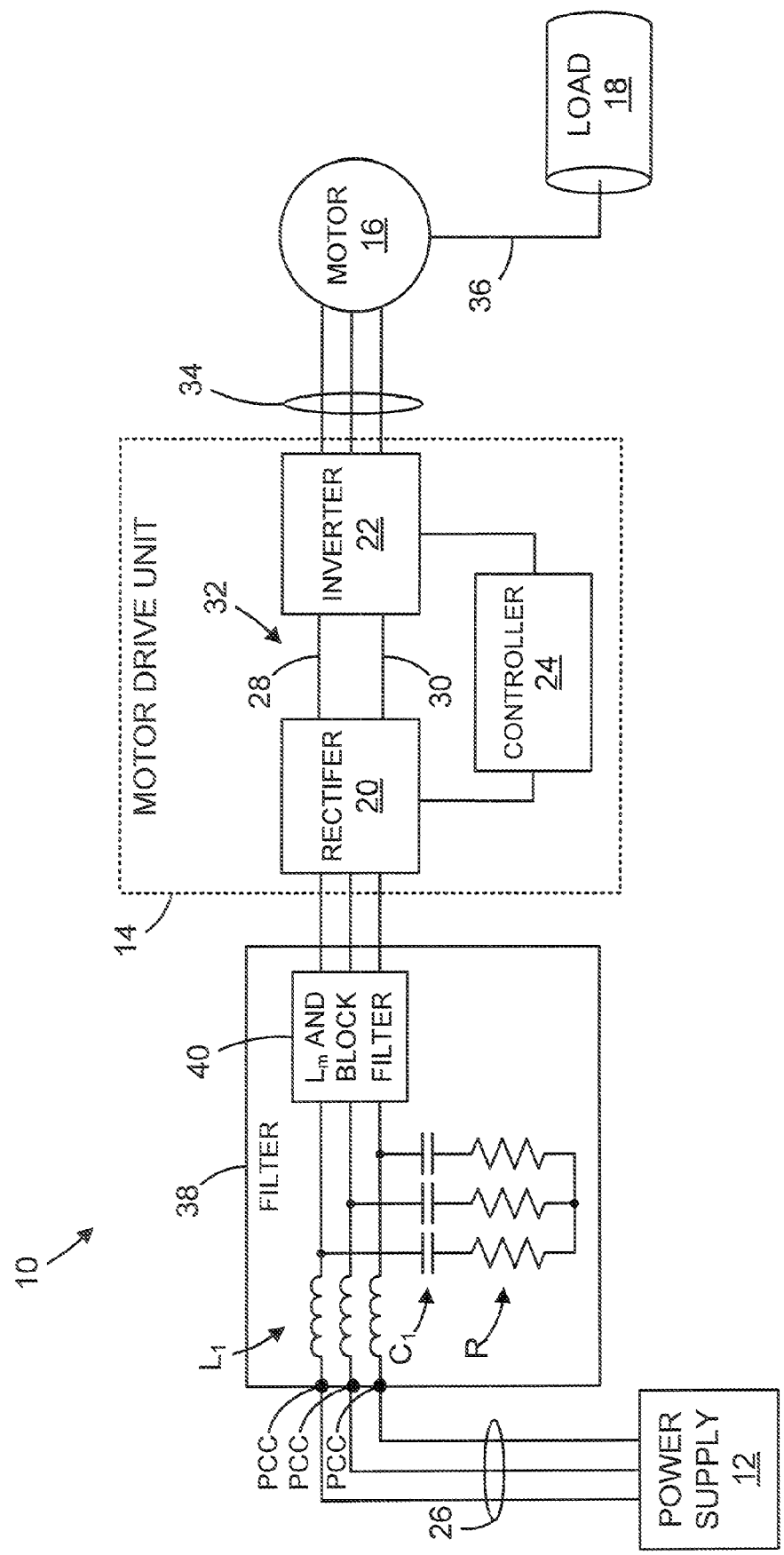
FIG. 2 is a schematic diagram of a motor system, associated traditional harmonic filter, and block filter circuit in accordance with the present invention.

Referring now to FIG. 2, a block filter 40 has been added to the motor system 10 as part of the filter 38 between the power supply 12 and the rectifier 20 of the motor drive unit 14. That is, the block filter 40 has been added to the filter 38 and is arranged between the point of common connection (PCC) between the supply lines 26 and the input to the motor drive unit 14. As will be described below, this filter configuration 38 including the block filter 40 will be referred to as an LCL-plus-C circuit. As will be described, the block filter 40 has an inductive reactance that is substantially equal to its capacitive reactance at the switching frequency of the rectifier.

As illustrated, it is contemplated that the main inductor ($L_m$) and block filter 40 may be formed as an integrated package that may be readily retrofitted into a traditional filter system 38. However, as will be described, it is contemplated that the main inductor $L_m$, and block filter 40 may be integrated with the other components of the filter 38.

Figure 3:
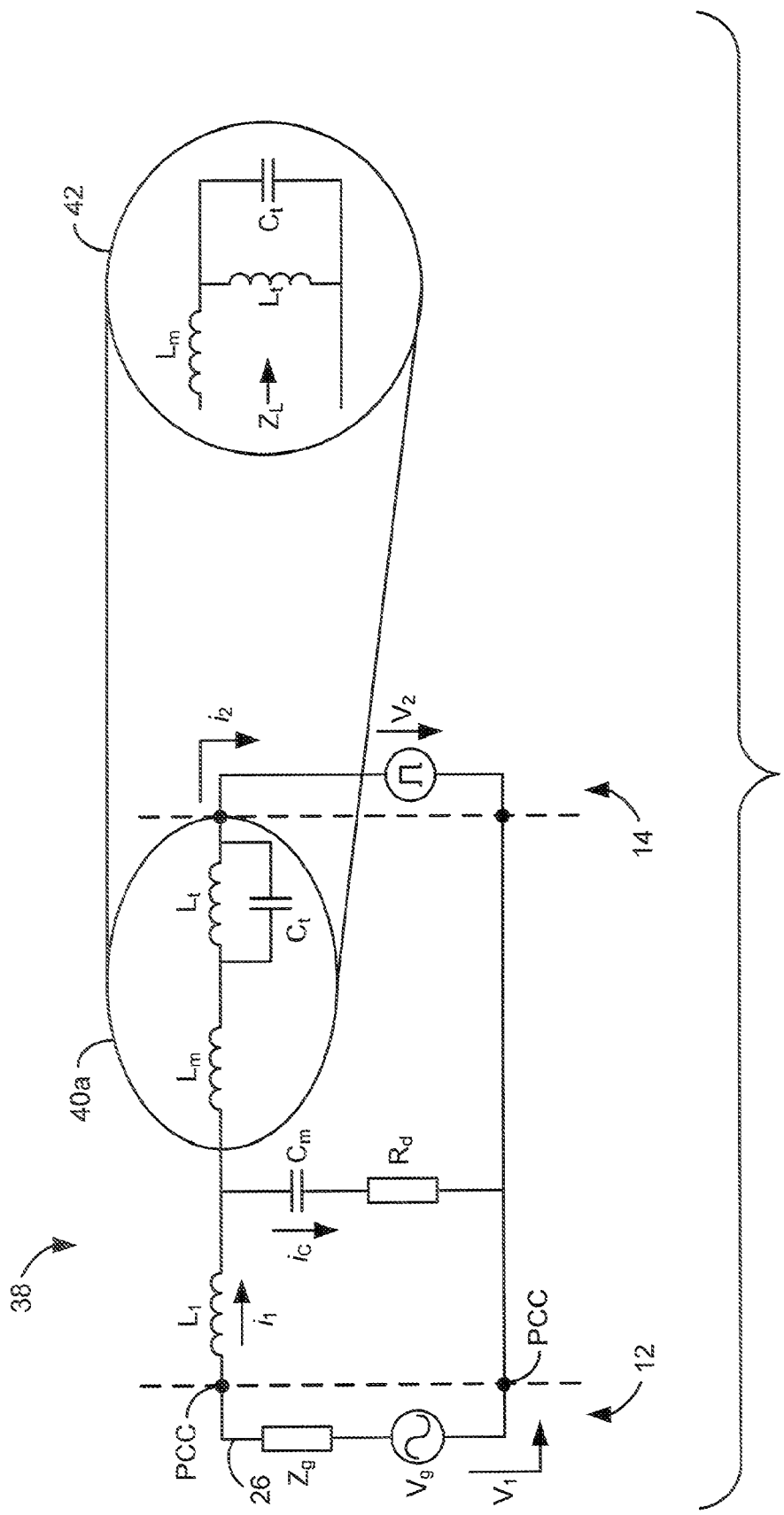
FIG. 3 is a circuit diagram of a filter system including a block filter circuit configuration and equivalent circuit in accordance with the present invention.
Figure 4:
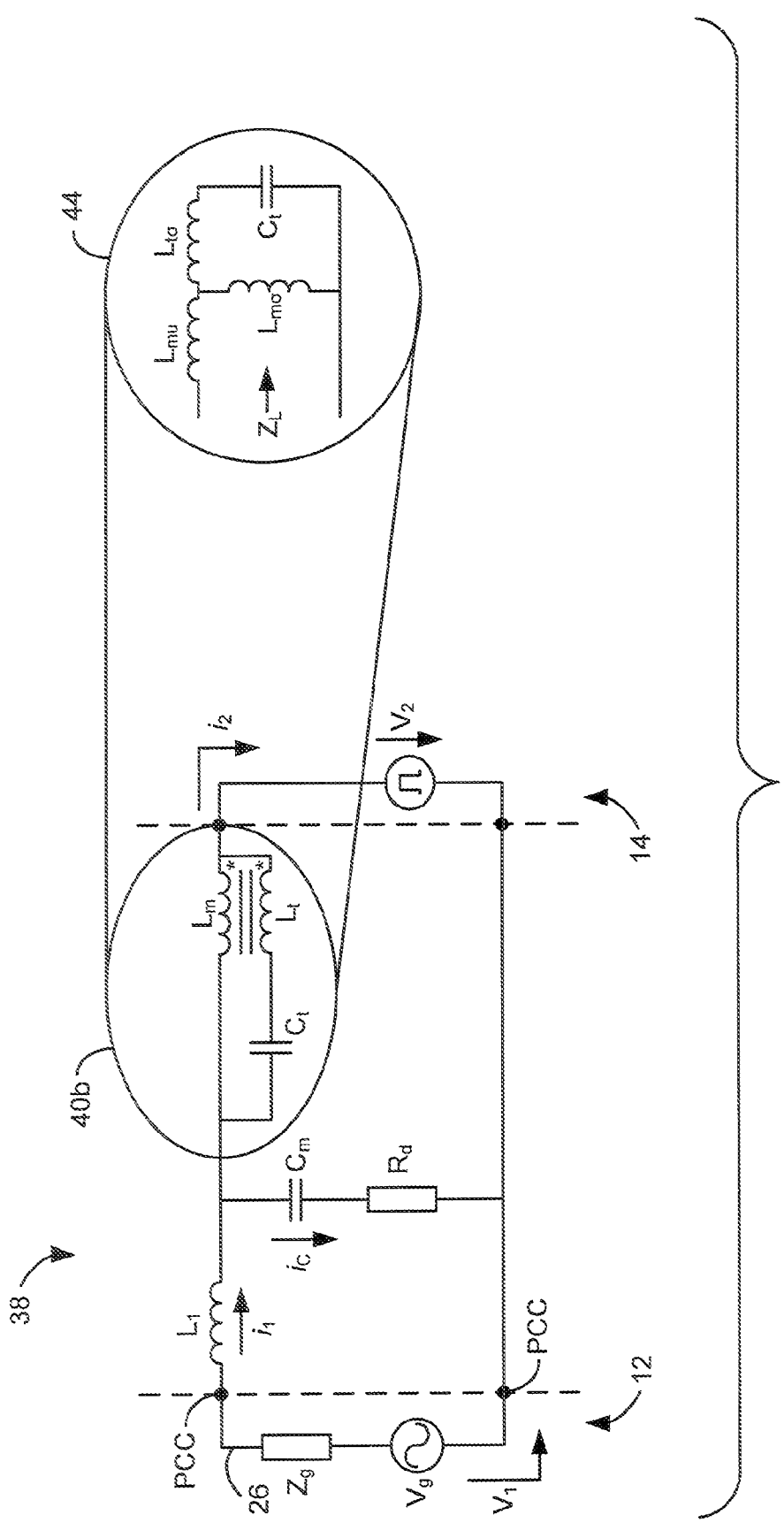
FIG. 4 is a circuit diagram of another filter system including another block filter circuit configuration and equivalent circuit in accordance with the present invention.
Figure 5:
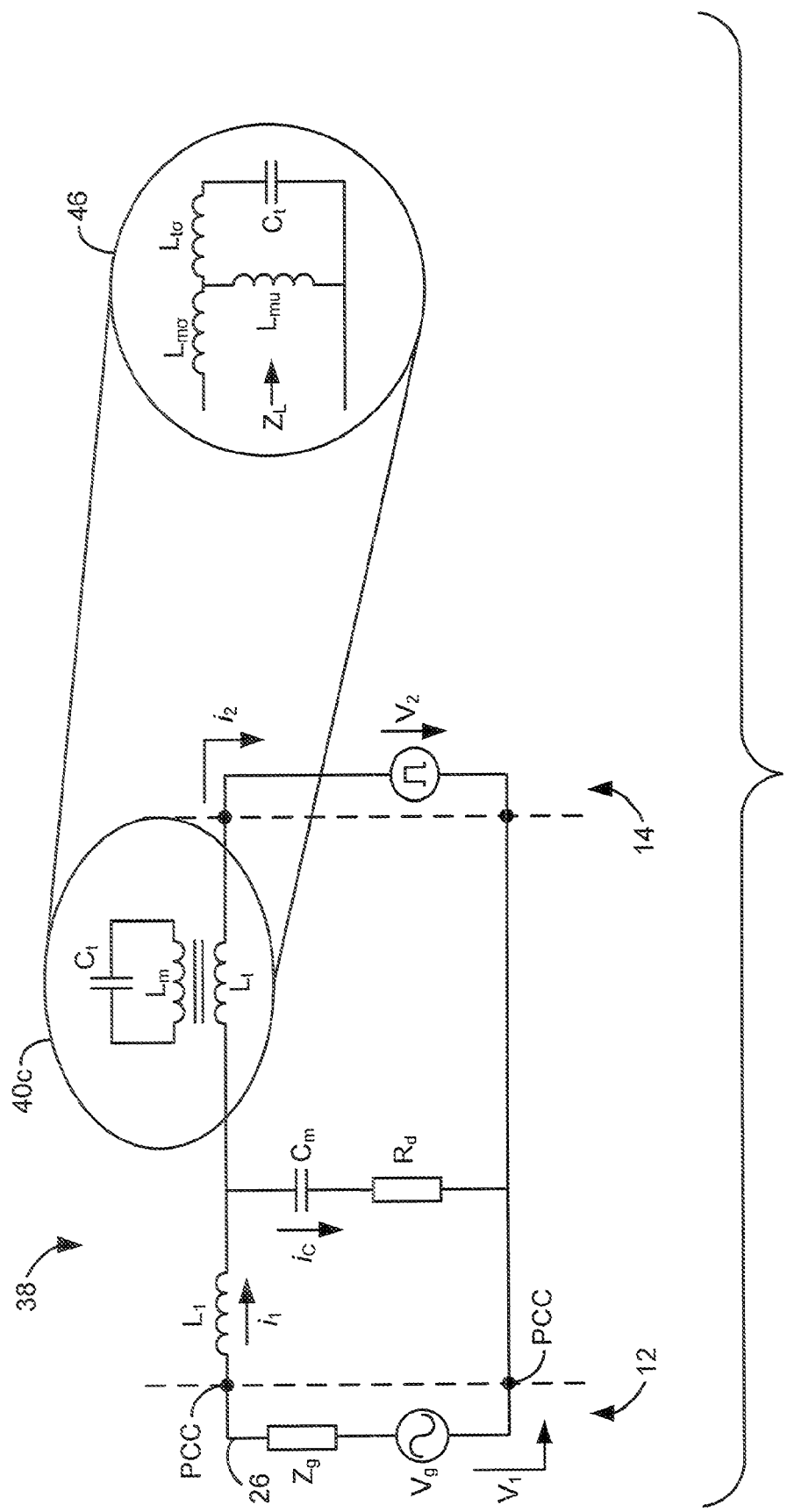
FIG. 5 is a circuit diagram of yet another filter system including another block filter circuit configuration and equivalent circuit in accordance with the present invention.

Referring now to FIGS. 3-5, a variety of configurations for the main inductor $L_m$ and block filter 40 of FIG. 2 are illustrated. Specifically, FIG. 3 shows a cascaded block filter 40a coupled with the above-described LCL filter to form an LCL-plus-C circuit. FIG. 3 also includes an equivalent circuit 42 of the cascaded block filter 40a. Additionally, FIG. 4 shows the above-described LCL filter coupled with a direct-coupled block filter 40b to form another LCL-plus-C circuit configuration. FIG. 4 further shows an equivalent circuit 44 of the direct-coupled block filter 40b. Finally, FIG. 5 shows the above-described LCL filter coupled with a transformer block filter 40c to form still another LCL-plus-C circuit configuration and an equivalent circuit 46 of the transformer block filter 40c.

As illustrated in FIG. 3, the cascaded block filter 40a can be readily separated from the main inductor $L_m$. In this regard, the cascaded block filter 40a can be used to retrofit a traditional LCL filter to create an LCL-plus C circuit. On the other hand, as illustrated in FIGS. 4 and 5, the block filters 40b, 40c can be integrated with the main inductor $L_m$ by sharing a common core. In the configurations illustrated in FIGS. 4 and 5, the main inductor $L_m$ has two windings for one phase. The main winding forms $L_m$ and the secondary winding forms $L_t$. As such, the direct-coupled block filter 40b and the transformer block filter 40c have identical equivalent circuits 44, 46. However, as will be shown below, the value of the capacitor $C_t$ in the transformer block filter 40c configuration shown in FIG. 5 can typically be reduced over that required in the direct-coupled block filter 40b configuration shown in FIG. 4. On the other hand, the direct-coupled block filter 40b will typically have a higher Q factor than the transformer block filter 40c.

In any case, each of the block filter configurations 40a-40c operates as an LC resonator that can be configured to have substantially similar admittance and frequency characteristics. Specifically, the resonant frequency of the LCL-plus-C circuit of 38 configured with the cascaded block filter 40a of FIG. 3 is given by:

$$f_{res} = \frac{1}{2\pi} \cdot \sqrt{\frac{L_1 + L_m + L_t}{L_1(L_m + L_t)C}} \quad \text{Eqn. 1}$$

Similarly, the resonant frequency of the LCL-plus-C circuit of 38 configured with the direct-coupled block filter 40b of FIG. 4 or the transformer block filter 40c of FIG. 5, which have identical equivalent circuits 44, 46, is given by:

$$f_{res} = \frac{1}{2\pi} \cdot \sqrt{\frac{L_1 + L_m}{L_1 L_m C}} \quad \text{Eqn. 2}$$

The specific component values of the block filters 40a, 40b, 40c, are selected based on the specific switching frequency of the rectifier 20 of the motor drive unit 14 of FIG. 2. In particular, the value of capacitor $C_t$ is selected to block the switching frequency component of injected harmonics. With respect to the direct-coupled block filter 40b, capacitor $C_t$ is selected by:

$$C_t = \frac{1}{(2\pi f_{sw})^2 (L_m + L_t - 2M)}; \qquad \text{Eqn. 3}$$

where $f_{sw}$ is the switching frequency of the rectifier 20, k is the coupling factor of $L_m$ and $L_t$ windings, and M is the mutual inductance given by:

$$M = k\sqrt{L_m L_t} \qquad \text{Eqn. 4}$$

Likewise, with respect to the cascaded block filter 40a and the transformer block filter 40b, capacitor $C_t$ is selected by:

$$C_t = \frac{1}{(2\pi f_{sw})^2 L_t}. \qquad \text{Eqn. 5}$$

It is contemplated that when extended to a three-phase system, the above-described system may be embodied using three separate single-phase main inductors $L_m$. On the other hand, it is contemplated that a single three-phase main inductor $L_m$ may also be used.

A few additional considerations aid in guiding the selection of $L_1$, $L_m$, and $L_t$. That is, since the high frequency current going through $L_1$, especially switching frequency components, is suppressed by the block circuit 40a, 40b, or 40c, the cost of including $L_1$ is relatively low because the current waveform is close to sinusoidal. Likewise, since only high frequency current is seen by $L_t$, the wire gauge of the coil can be relatively high, depending on the turn ratio of the coil in $L_t$ and $L_m$, which reduces implementation costs. Further cost and size savings can be realized when selecting the capacitance value, which can be relatively low, for example, 0.035 µF for 20 HP motor drive units. Furthermore, since the high frequency current seen by $L_m$ is relatively high, the inductor design of $L_m$ should provide a relatively low core flux density or low high-frequency loss core, such as a ferrite or other inductor having a ferromagnetic compound core.

Figure 6:
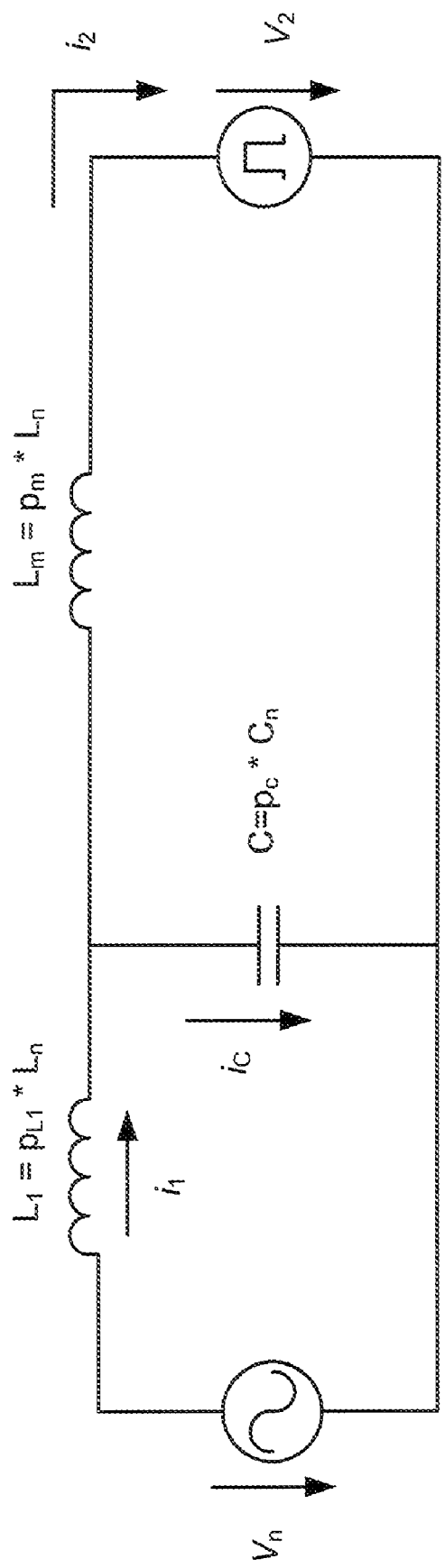
FIG. 6 is a partial, simplified circuit diagram showing that the use of fixed component percentages allows motor drive units with differing power ratings to have similar current total harmonic distortion values.

The specific implementations of the above-described block filters 40a, 40b, 40c may be readily scaled to a desired power rating. Specifically, the percentage of harmonic components permitted by the block filters 40a, 40b, 40c are determined by the percentage value relationship of $L_1$, $L_m$, and $C_m$ . . . Referring now to FIG. 6, the filter configurations described above have been simplified to an LCL configuration for the purpose of illustrating that the use of fixed component percentages allows motor drive units with differing power ratings to have similar current total harmonic distortion values. Specifically, the percentage of harmonic components permitted can be significantly controlled by the percentage value relationship of $L_1$, $L_m$, and $C_m$, regardless of power ratings, as follows:

$$\frac{i_1(s)}{I_n} = \sqrt{3} \frac{1}{p_{L_1} \cdot p_{L_m} \cdot p_c \left(\frac{s}{\omega_n}\right)^3 + (p_{L_1} + p_{L_m}) \cdot \left(\frac{s}{\omega_n}\right)} \cdot \frac{V_2(s)}{V_n}; \qquad \text{Eqn. 6}$$

$$\frac{i_2(s)}{I_n} = \sqrt{3} \frac{p_{L_1} \cdot p_c \left(\frac{s}{\omega_n}\right)^2 + 1}{p_{L_1} \cdot p_{L_m} \cdot p_c \left(\frac{s}{\omega_n}\right)^3 + (p_{L_1} + p_{L_m}) \cdot \left(\frac{s}{\omega_n}\right)} \cdot \frac{V_2(s)}{V_n}; \qquad \text{Eqn. 7}$$

$$\frac{i_c(s)}{I_n} = \frac{i_1(s)}{I_n} - \frac{i_2(s)}{I_n}; \qquad \text{Eqn. 8}$$

-continued $$\omega_{res} = \sqrt{\frac{p_{L_1} + p_{L_m}}{p_{L_1} \cdot p_{L_m} \cdot p_c}} \cdot \omega_n; \qquad \text{Eqn. 9}$$

where $p_{L_1}$ is the percentage value of $L_1$, $p_{L_m}$ is the percentage value of $L_m$, $p_c$ is the percentage value of C, $V_n$ is the rated line voltage, $I_n$ is the rated line current, $\omega_n$ is the rated line angular frequency, and $\omega_{res}$ is the resonance angular frequency. The inductance/capacitance bases are:

$$R_n = \frac{V_n}{\sqrt{3} \cdot I_n}; \qquad \text{Eqn. 10}$$

$$C_n = \frac{1}{R_n \cdot \omega_n}; \qquad \text{Eqn. 11}$$

and $$L_n = \frac{R_n}{\omega_n}. \qquad \text{Eqn. 12}$$

It should be noted that for simplicity, the above calculations have neglected the resistance of the filter. However, the inclusion of inductor resistance and damping resistance does not alter the fact that, as illustrated above, by maintaining fixed percentages of $L_1$, $L_m$ and C, total harmonic distortions of $i_1$, $i_2$, and $i_c$ can be controlled across a variety of motor drives with a variety of power ratings.

Similarly, as illustrated below, the percentage value of $C_t$ does not vary with power ratings:

$$p_{C_t} = \left(\frac{\omega_n}{\omega_{sw}}\right)^2 \frac{1}{\lambda \cdot p_{L_m}}; \qquad \text{Eqn. 13}$$

where $\omega_{sw}$ is the angular switching frequency of the rectifier of the motor drive and is equal to $f_{sw}$ multiplied by $2\pi$. Additionally, $\lambda$ is the ratio of $L_t$ to $L_m$, which, as described above, is typically a fixed ratio.

Figure 1:
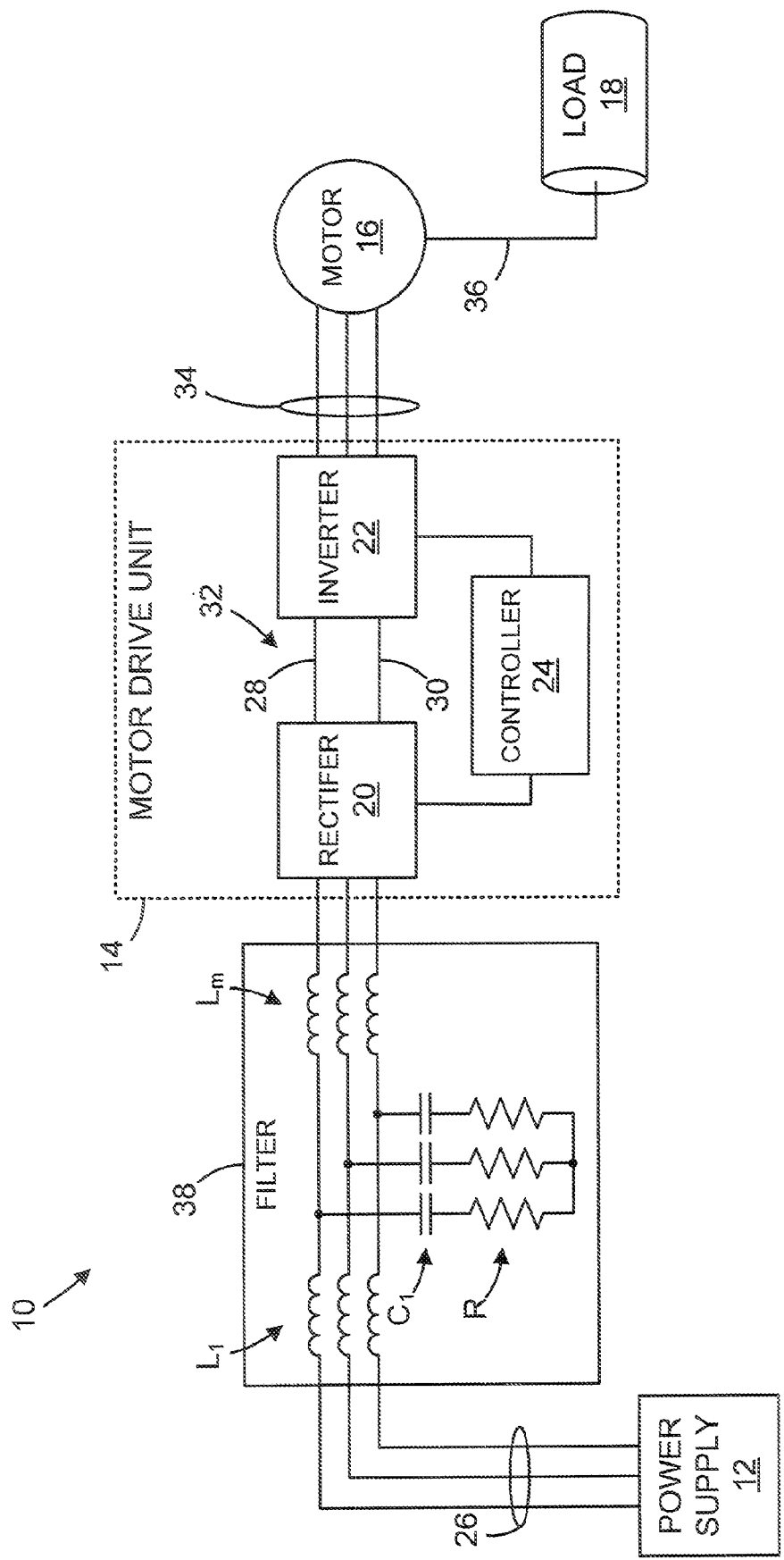
FIG. 1 is a schematic diagram of a motor system and associated traditional harmonic filter circuit.

When compared to a traditional LCL filter, such as illustrated in FIG. 1, the above-described filter systems including the block filters 40 to form an LCL-plus-C circuit are able to significantly suppress current harmonics with switching frequency current at the PCC. For example, residual high frequency harmonics may be suppressed to significantly less than 0.5 percent of peak phase current. Since the above-described filter system significantly reduces the harmonic current at the switching frequency at the rectifier input, the current total harmonic distortion at the rectifier input is also reduced, even though some increase in the second and third order switching frequency harmonics may be experienced.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A motor drive system comprising:
 a power input configured to receive alternating current (AC) power;
 a rectifier having a switching frequency selected to convert the AC power to direct current (DC) power;

an input filter circuit connected between the power input and the rectifier and configured to suppress frequency harmonics across a range of harmonics;

a block filter circuit connected between the power input and the rectifier and configured to substantially block frequency harmonics associated with the switching frequency of the rectifier;

the input filter circuit and the block filter circuit arranged to form an LCL-plus C circuit; and an inverter configured to receive the DC power from the rectifier and convert the DC power to a series of pulses configured to drive a motor.

2. The motor drive system of claim 1 wherein the input filter circuit includes at least one inductor and a capacitor configured to suppress high-frequency harmonics.

3. The motor drive system of claim 1 wherein the block filter circuit includes an inductive reactance and a capacitive reactance that are substantially equal at the switching frequency of the rectifier.

4. The motor drive system of claim 1 wherein LCL-plus-C circuit includes an input inductor inductance ($L_1$), a main inductor inductance ($L_m$), a main capacitor capacitance ($C_m$), a t-coil inductance ($L_t$), and a t-coil capacitance ($C_t$) and wherein:

$$C_t = \frac{1}{(2\pi f_{sw})^2 (L_m + L_t - 2M)};$$

where $f_{sw}$ is the switching frequency of the rectifier and M is the mutual inductance between $L_m$ and $L_t$.

5. The motor drive system of claim 1 wherein LCL-plus-C circuit includes a input inductor inductance ($L_1$), a main inductor inductance ($L_m$), a main capacitor capacitance ($C_m$), a block inductance ($L_t$), and a block capacitance ($C_t$) and wherein:

$$C_t = \frac{1}{L_t (2\pi f_{sw})^2};$$

where $f_{sw}$ is the switching frequency of the rectifier.

6. The motor drive system of claim 1 wherein the block filter circuit includes a first inductor and a second inductor sharing a common core.

7. The motor drive system of claim 6 wherein the block filter further includes a capacitor in series with the second inductor.

8. The motor drive system of claim 6 wherein the block filter further includes a capacitor in parallel with the second inductor.

9. The motor drive system of claim 6 wherein the first inductor forms a first winding of a transformer and the second winding forms a second winding of a transformer.

10. A motor drive unit comprising:
a power input configured to receive AC power;
a filter and block circuit configured to filter the AC power and include an input inductor ($L_1$), a main inductor ($L_m$), a main capacitor ($C_m$), a block inductor ($L_t$), and a block capacitor ($C_t$) arranged in an LCL-plus-C circuit;
a rectifier configured to receive filtered AC power from the filter and having a switching frequency selected to convert the AC power to DC power;
an inverter configured to receive the DC power from the rectifier and convert the DC power to a series of pulses configured to drive a motor; and
wherein at least one of the block inductor and block capacitor are configured to substantially block harmonics associated with the switching frequency of the rectifier.

11. The motor drive unit of claim 10 wherein the input inductor, main inductor, and main capacitor form an LCL circuit configured to reduce a range of harmonics.

12. The motor drive unit of claim 11 wherein the block inductor is arranged in series with the main inductor and wherein the block capacitor is arranged in parallel with the block inductor.

13. The motor drive unit of claim 11 wherein the block inductor and the block capacitor are arranged in parallel with the main inductor.

14. The motor drive unit of claim 11 wherein the block inductor and the block capacitor are arranged in series and together in parallel with the main inductor.

15. The motor drive unit of claim 11 wherein the block inductor is coupled to the main inductor through a common core.

16. An input filter connected to a power supply line to receive AC power and deliver the AC power to a rectifier, the rectifier having a plurality of switches controlled by at least one switching signal having a switching frequency to convert the AC power to DC power and deliver the DC power to an inverter, the inverter is configured to convert the DC power to pulses configured to drive a motor, the input filter comprising:
a main inductor configured to receive the AC power and reduce harmonics along the power supply line;
a block inductor connected to the main inductor;
a block capacitor connected to the main inductor; and
wherein at least one of the block inductor and the block capacitor are arranged in a block circuit configured to substantially reduce harmonics associated with the switching frequency.

17. The input filter of claim 16 wherein the block inductor is arranged in series with the main inductor and the block capacitor is arranged in parallel with the block inductor.

18. The input filter of claim 16 wherein the main inductor and the block inductor share a common core.

19. The input filter of claim 18 wherein the block capacitor is arranged in series with the block inductor.

20. The input filter of claim 18 wherein the block capacitor is arranged in parallel with the block inductor.

* * * * *